US007149638B2

(12) United States Patent
Stephens

(10) Patent No.: US 7,149,638 B2
(45) Date of Patent: Dec. 12, 2006

(54) SEPARATION OF RANDOM AND DETERMINISTIC COMPONENTS OF JITTER

(75) Inventor: Ransom W. Stephens, Petaluma, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 11/092,091

(22) Filed: Mar. 29, 2005

(65) Prior Publication Data

US 2006/0229835 A1 Oct. 12, 2006

(51) Int. Cl.
*G01R 13/00* (2006.01)
(52) U.S. Cl. .............................. 702/69; 702/66; 375/226
(58) Field of Classification Search .................. 702/57, 702/58, 65–67, 69, 70, 180–183, 128; 375/130, 375/226, 355, 356, 371
See application file for complete search history.

(56) References Cited

U.S. PATENT DOCUMENTS

| 6,298,315 | B1 * | 10/2001 | Li et al. ...................... 702/180 |
| 6,356,850 | B1 * | 3/2002 | Wilstrup et al. .............. 702/69 |
| 6,931,335 | B1 * | 8/2005 | Mueller ....................... 702/69 |
| 7,016,805 | B1 * | 3/2006 | Sun et al. .................... 702/181 |
| 2003/0004664 | A1 | 1/2003 | Ward et al. |
| 2003/0115017 | A1 * | 6/2003 | Sun et al. .................... 702/181 |
| 2004/0146097 | A1 * | 7/2004 | Jungerman et al. ......... 375/226 |
| 2005/0111536 | A1 * | 5/2005 | Cranford et al. ............. 375/226 |
| 2005/0232345 | A1 * | 10/2005 | Ward et al. ................... 375/224 |
| 2006/0045175 | A1 * | 3/2006 | Draving et al. .............. 375/224 |
| 2006/0047450 | A1 * | 3/2006 | Tabatabaei et al. ........... 702/69 |

FOREIGN PATENT DOCUMENTS

EP 1 267 172 A2 12/2002

OTHER PUBLICATIONS

Jitter Analysis: The dual-Dirac Model, RJ/DJ, and Q-scale, White Paper, Agilent Technologies, Inc., Jan. 5, 2005.
Precision jitter analysis using the Agilent 86100C DCA-J, Agilent Technologies, Inc., Jun. 16, 2004, Part No. 5989-1146EN.
Jitter Fundamentals: Agilent N4900 Serial BERT Series Jitter Injection and Analysis Capabilities Agilent Technologies 2003, Part No. 5989-0089EN.

* cited by examiner

*Primary Examiner*—Carol S.W. Tsai

(57) ABSTRACT

Random and deterministic components of jitter are separated. A measured value for deterministic jitter and a plurality of values for random jitter are used to calculate a plurality of first ratios ($\xi^{ml}$) of random jitter to deterministic jitter. For each of the plurality of values for random jitter, the value for random jitter is convolved with the measured value for deterministic jitter and a double delta approximation is performed on the result to calculate a plurality of second ratios ($\xi^{dd}$) of random jitter to deterministic jitter. A double delta approximation is performed on a measured jitter distribution to obtain a ratio ($\xi^{dd}_{meas}$) of random jitter to deterministic jitter. The ratio ($\xi^{dd}_{meas}$) is adjusted using a relationship of the plurality of first ratios ($\xi^{ml}$) to the plurality of second ratios ($\xi^{dd}$) in order to produce a corrected ratio ($\xi^{ml}_{corr}$).

11 Claims, 5 Drawing Sheets

SEPARATION OF RANDOM AND DETERMINISTIC COMPONENTS OF JITTER

BACKGROUND

Jitter is a measure of the timing variations of logic transitions of digital data signals. The standard practice in high-data rate (e.g., greater than 1 gigabit per second (Gb/s)) serial technologies is to analyze jitter in terms of two sub-components: Random Jitter (RJ) and Deterministic Jitter (DJ). These sub-components are separated from the whole jitter distribution for two reasons. The first reason is to provide a diagnostic tool for debugging circuits. The second reason is to facilitate a quick estimate of Total Jitter measured at a given Bit Error Ratio TJ (BER).

The jitter distribution is closely related to the probability density function (PDF) for finding a particular data transition at some distance from the ideal point. The applied jitter signal is the phase modulation applied to the data pattern which determines the timing position of edges. For example, a sinusoidal applied jitter signal $\phi(t)=A\sin(\omega t)$ yields a jitter PDF ($\rho(x)$) that follows Equation 1 below:

$$\rho(x) = \frac{1/A}{\sqrt{1-\frac{x^2}{A^2}}}.$$  Equation 1

RJ and DJ of a jitter distribution can be separately approximated using the double-delta technique (also known as the 'dual-Dirac' technique). In the double-delta technique, two key assumptions are made of the RJ and DJ distributions. The first assumption is that RJ follows a Gaussian distribution. A Gaussian distribution is specified by three parameters, its amplitude, width (represented by the standard deviation $\sigma$), and mean value (represented by $\mu$). For jitter analysis the key RJ parameter is the width (standard deviation $\sigma$ of the Gaussian distribution). The second assumption is that the DJ distribution is assumed to be bounded. The double-delta approximation is built on the assumption that any jitter distribution can be quantitatively described as the sum of two Gaussian distributions of not necessarily equal amplitudes or widths. For more information on the double-delta technique, see for example U.S. Pat. No. 6,298,315 and U.S. Pat. No. 6,356,850.

SUMMARY OF THE INVENTION

In accordance with an embodiment of the present invention, random and deterministic components of jitter are separated. A measured value for deterministic jitter and a plurality of values for random jitter are used to calculate a plurality of first ratios ($\xi^{ml}$) of random jitter to deterministic jitter. For each of the plurality of values for random jitter, the value for random jitter is convolved with the measured value for deterministic jitter and a double delta approximation is performed on the result to calculate a plurality of second ratios ($\xi^{dd}$) of random jitter to deterministic jitter. A double delta approximation is performed on a measured jitter distribution to obtain a ratio ($\xi^{dd}_{meas}$) of random jitter to deterministic jitter. The ratio ($\xi^{dd}_{meas}$) is adjusted using a relationship of the plurality of first ratios ($\xi^{ml}$) to the plurality of second ratios ($\xi^{dd}$) in order to produce a corrected ratio ($\xi^{ml}_{corr}$).

DESCRIPTION OF THE EMBODIMENT

Figure 1:
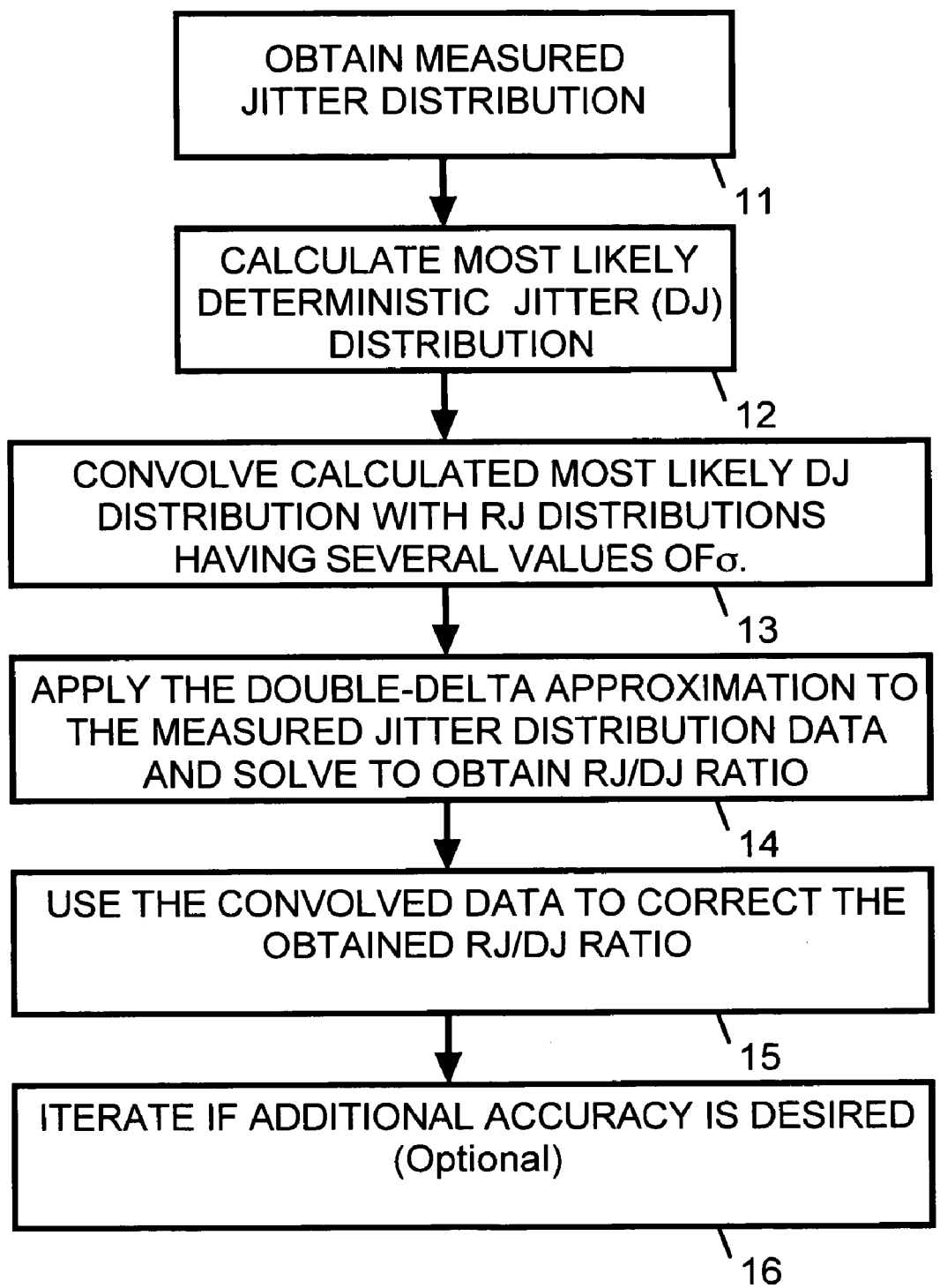
FIG. 1 is a flowchart that illustrates separation of random and deterministic components of jitter in accordance with an embodiment of the present invention.

FIG. 1 is a flowchart that illustrates separation of random and deterministic components of jitter. In a block 11, total measured jitter distribution is obtained from a device under test. This is illustrated by FIG. 2.

Figure 2:
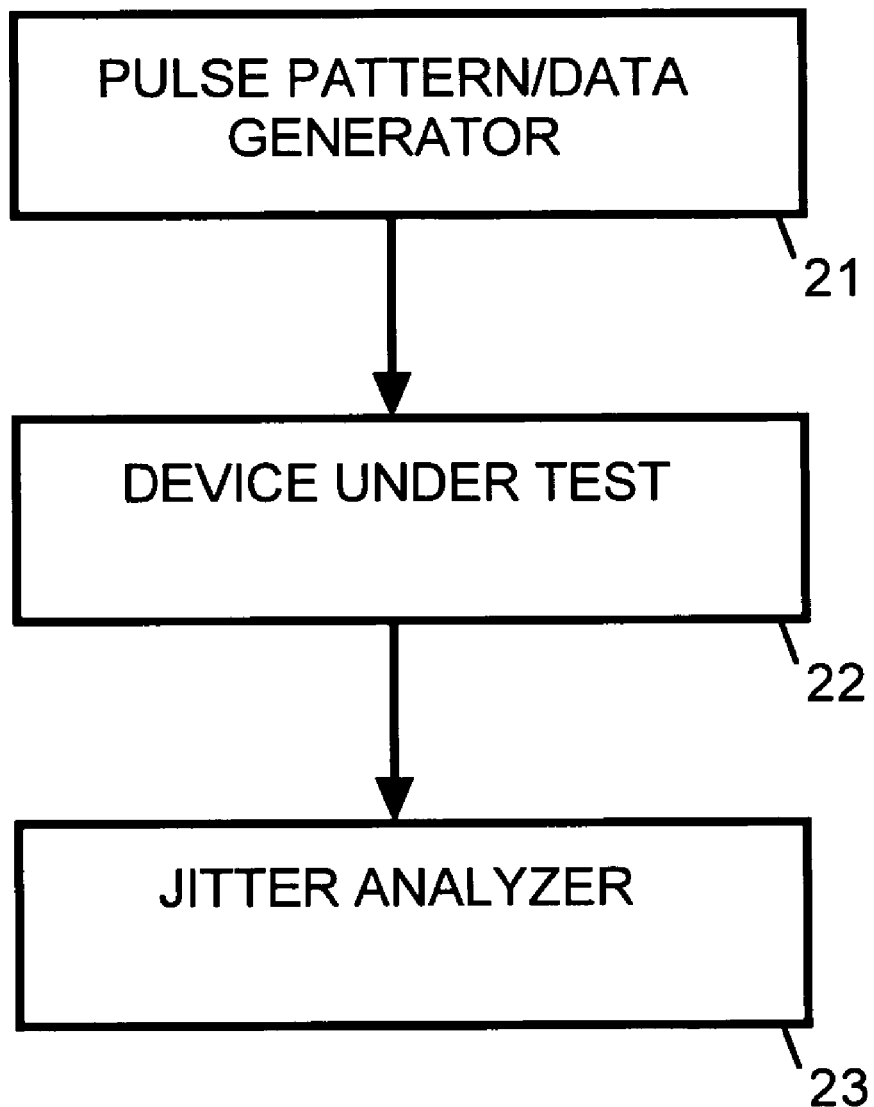
FIG. 2 illustrates a jitter analyzer obtaining a measured jitter distribution from a device under test in accordance with an embodiment of the present invention.

In FIG. 2, pulse pattern generator or data generator 21 generates a pattern of data for processing by a device under test (DUT) 22. DUT 22 is, for example a transmitter or a transmission channel. A jitter analyzer 22 receives a data signal from DUT 22. Jitter analyzer 22 measures the jitter within data signal to determine a total measured jitter distribution ($\rho^{meas}(x)$). For example, jitter analyzer 22 is a real-time oscilloscope, a sampling oscilloscope, a time interval analyzer or some other type of analyzer capable of producing a jitter distribution.

In block 12, shown in FIG. 1, the most likely deterministic jitter distribution is calculated and represented by $J_{PP}^{ml}$. $J_{PP}^{ml}$ represents most likely (ML) peak-to-peak jitter as calculated. $J_{PP}^{ml}$ is calculated, for example, by measuring the S-parameters of the transmission paths of the DUT in conditions of very low noise and calculating the intersymbol interference timing jitter distribution.

Figure 3:
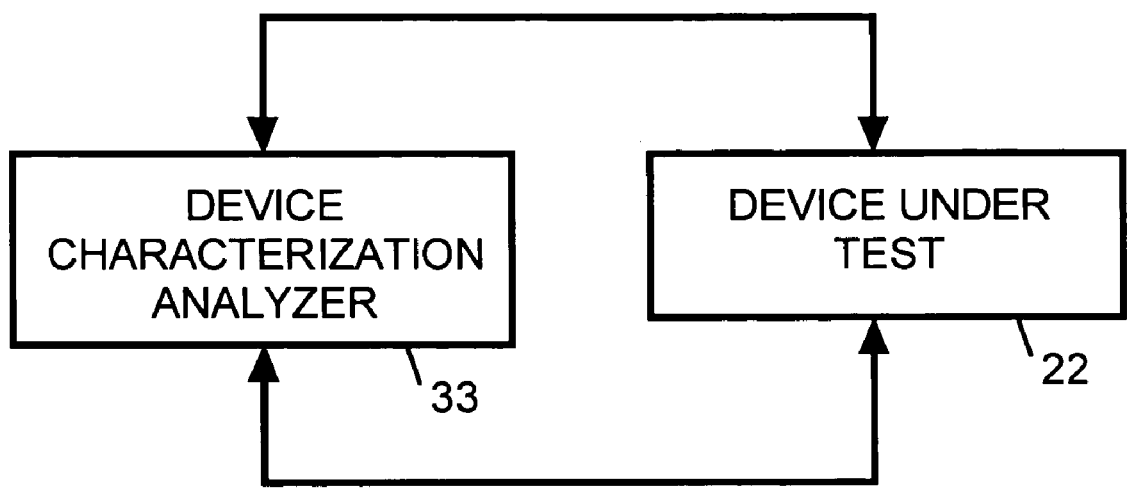
FIG. 3 illustrates a device characterization analyzer characterizing a device under test to obtain a most likely deterministic jitter distribution in accordance with an embodiment of the present invention.

FIG. 3, illustrates measurement of S-parameters to calculate a DJ distribution. FIG. 3 shows device under test 22 connected to a device characterization analyzer 33. For example, device characterization analyzer 33 is a vector network analyzer or some other analyzer capable of performing a characterization of device under test 22.

In a block 13, the calculated deterministic jitter ($J_{PP}^{ml}$) distribution is convolved with random jitter (RJ) distributions having several values of $\sigma^{ml}$ to produce, for each value of $\sigma^{ml}$, a jitter distribution ($\rho^{ml}(x)$) which can be used as the jitter distribution ($\rho^{dd}(x)$) for a double delta approximation that can be deconvolved to obtain double delta approximations for RJ and DJ. That is, for each value of $\sigma^{ml}$, the double delta approximation is utilized on the resulting calculated jitter distribution ($\rho^{ml}(x)=\rho^{dd}(x)$) to determine an $\sigma^{dd}$ representing RJ distribution for the double delta approximation and to determine $J_{pp}^{dd}$ representing the DJ distribution for a double delta approximation.

The double delta approximation is, for example, described by Equation 2 below:

$$\rho^{dd}(x) \approx A_L \frac{1}{\sqrt{2\pi}\,\sigma_L} \exp\left(-\frac{(x-\mu_L)^2}{2\sigma_L^2}\right) + A_R \frac{1}{\sqrt{2\pi}\,\sigma_R} \exp\left(-\frac{(x-\mu_R)^2}{2\sigma_R^2}\right)$$  Equation 2

In equation 2, the L subscript indicates the left edge of the two Gaussian distributions of the double delta approximation model. The R subscript indicates the right edge of the two Gaussian distributions. $A_L$ represents the amplitude of left edge of the two Gaussian distributions. $A_R$ represents the amplitude of right edge of the two Gaussian distributions. $\sigma_L$ represents the standard deviation for the left edge of the two Gaussian distributions. $\sigma_R$ represents the standard deviation for the right edge of the two Gaussian distributions. $\mu_L$ represents the mean for the left edge of the two Gaussian distributions. $\mu_R$ represents the mean for the right edge of the two Gaussian distributions.

For the double-delta approximation of Equation 2, random jitter (RJ) distribution is represented by $\sigma^{dd}=0.5*(\sigma_L+\sigma_R)$. Deterministic jitter (DJ) distribution is represented by $J_{PP}^{dd}=(\mu_R-\mu_L)$.

For each value of calculated jitter distribution ($\rho^{ml}(x)=(\rho^{dd}(x))$, Equation 2 can be solved, to obtain $\sigma^{dd}=0.5*(\sigma_L+\sigma_R)$ and $J_{PP}^{dd}=(\mu_R-\mu_L)$.

Figure 4:
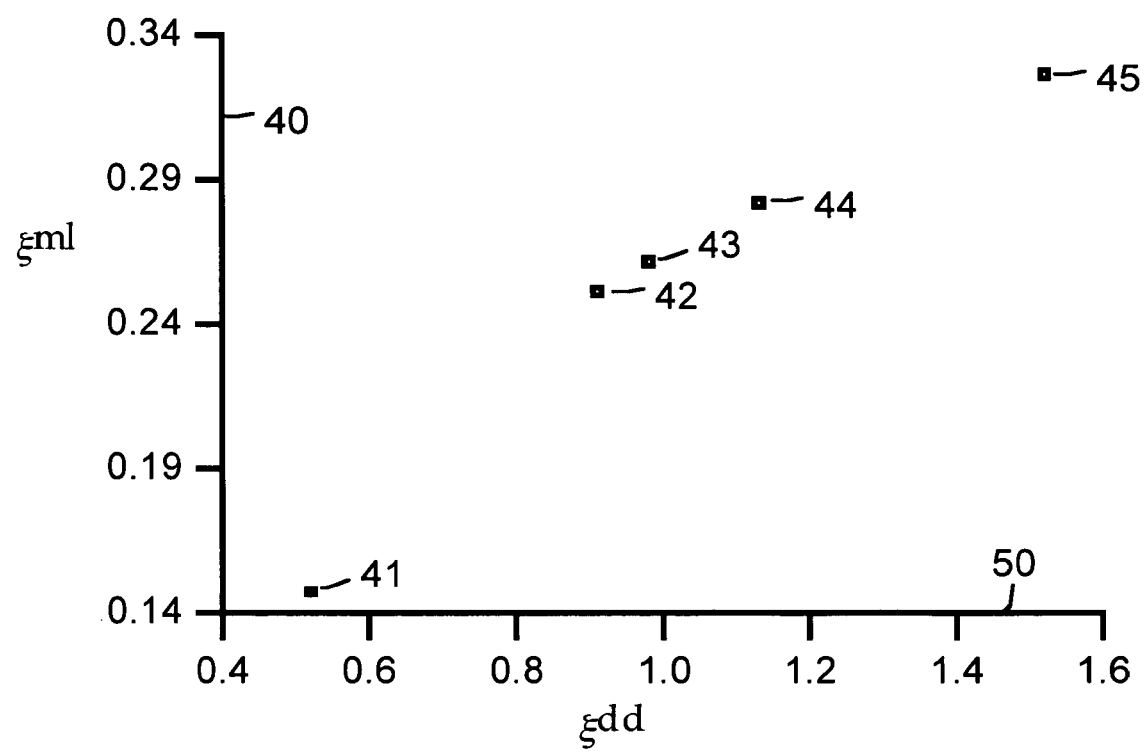
FIG. 4 and FIG. 5 are plots of ratios used to illustrate the obtaining of corrected double delta approximation values in accordance with an embodiment of the present invention.

For various values of $\sigma^{ml}$, FIG. 4 shows an example plot of the ratio $\xi^{ml}=\sigma^{ml}/J_{PP}^{ml}$ on y-axis 40 verses the ratio $\xi^{dd}=\sigma^{dd}/J_{PP}^{dd}$ on x-axis 50 for plotted data points 41, 42, 43, 44 and 45.

The relationship of $\xi^{ml}$ to $\xi^{dd}$ shown in FIG. 4, can be used to perform a correction to the double delta approximation model.

For example, in a block 14 of FIG. 1, the double delta approximation model is applied to a measured jitter distribution ($\rho^{meas}(x)$) to obtain $\xi^{dd}_0=\sigma^{dd}_0/J_{PP}^{dd}_0$ for the measured jitter distribution ($\rho^{meas}(x)$).

In block 15 of FIG. 1, the convolved data (represented by the plotted data points 41, 42, 43, 44 and 45 shown in FIG. 4) is used to obtain a value for a corrected ratio $\xi^{ml}_{corr}$ of RJ to DJ for the total measured jitter distribution ($\rho^{meas}(x)$) obtained in block 11. For example, a first order approximation of the relationship of the ratio $\xi^{ml}_{corr}$ and the ratio $\xi^{dd}_{meas}$ can performed using the closest points on both sides of $\xi^{dd}_{meas}$ for $\xi^{dd}$ as used in block 13. For example, the first order approximation is represented by Equation 3 below:

$$\xi^{ml}=K_1+K_2*\xi^{dd} \quad \text{Equation 3}$$

Figure 5:
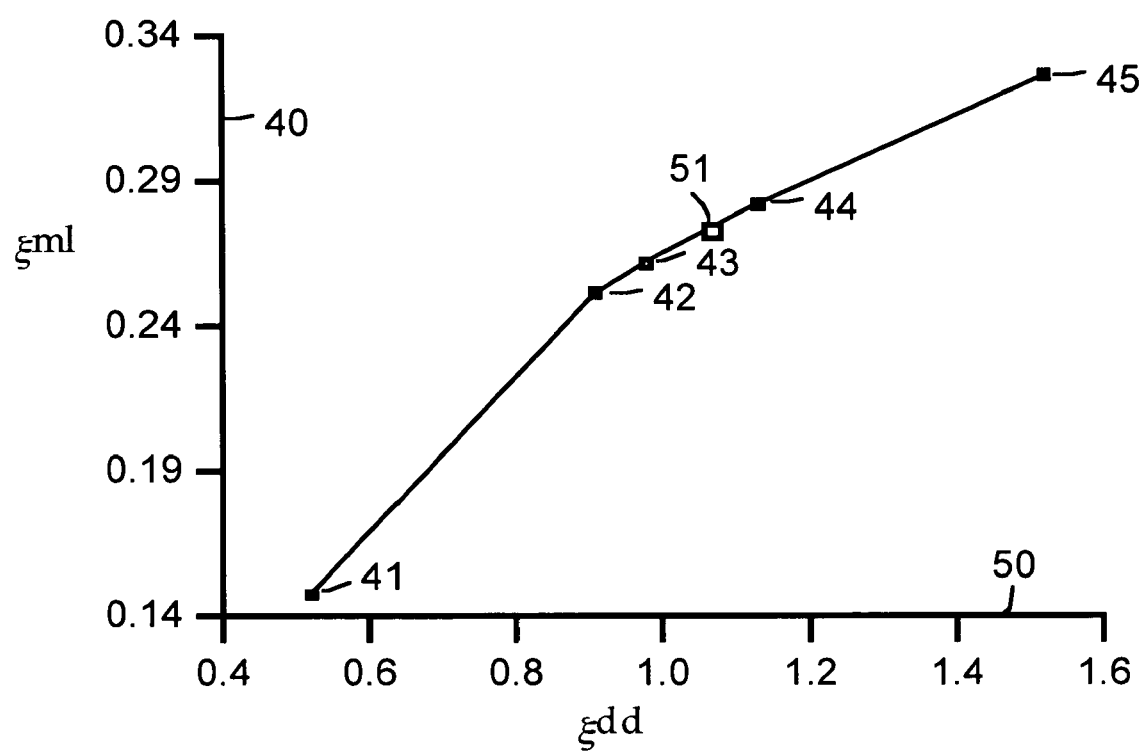

In Equation 3, constants $K_1$ and $K_2$ are constants defined by the line intersecting the closest calculated data points for $\xi^{dd}$ on both sides of $\xi^{dd}_{meas}$. For example, as illustrated by FIG. 5, the $\xi^{dd}_{meas}$ for point 51 is between the $\xi^{dd}$ values for plotted data points 43 and 44, shown in FIG. 5. By plotting $\xi^{ml}_{corr}$ on the line intersecting plotted data points 43 and 44, as represented by estimated data point 51, a value for $\xi^{ml}_{corr}$ is obtained.

As will be understood, many other approximations could be used to establish a relationship between the ratio $\xi^{ml}$ and the ratio $\xi^{dd}$. Typically the approximations will involved some type of curve fitting of the calculated data points represented by plotted data points 41, 42, 43, 44 and 45.

In a block 16 additional iterations can be performed if greater accuracy is required.

The determined relationship between the ratio $\xi^{ml}$ and the ratio $\xi^{dd}$ allows more accurate separation of components of random jitter and deterministic jitter. For example, in many cases it is possible to measure and/or approximate fairly accurately a value for total measured jitter distribution and a value for $\sigma$. $\xi^{ml}$ can then be used to obtain a value for $J_{PP}$ using the ratio $\xi^{ml}=\sigma/J_{PP}$. For example, a phase-noise analyzer can be used to measure $\sigma$ by integrating the continuous noise of a clock signal to get the root-mean-square (rms) noise. The rms noise can be identified as $\sigma$. Alternatively, a value for total measured jitter distribution and a value for $J_{PP}$ can be obtained. $\xi^{ml}$ can then be used to obtain a value for $\sigma$.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for separating random and deterministic components of jitter comprising the following:
   using a measured value for deterministic jitter and a plurality of values for random jitter to calculate a plurality of first ratios ($\xi^{ml}$) of random jitter to deterministic jitter;
   for each of the plurality of values for random jitter, convolving the value for random jitter with the measured value for deterministic jitter and performing a double delta approximation to calculate a plurality of second ratios ($\xi^{dd}$) of random jitter to deterministic jitter;
   performing a double delta approximation on a measured jitter distribution to obtain a ratio ($\xi^{dd}_{meas}$) of random jitter to deterministic jitter; and,
   adjusting the ratio ($\xi^{dd}_{meas}$) using a relationship of the plurality of first ratios ($\xi^{ml}$) to the plurality of second ratios ($\xi^{dd}$) in order to produce a corrected ratio ($\xi^{ml}_{corr}$) for allowing more accurate separation of components of random jitter and deterministic jitter.

2. A method as in claim 1 wherein the measured jitter distribution is obtained from a device under test using a jitter analyzer.

3. A method as in claim 1 wherein the measured value for deterministic jitter is obtained using a device characterization analyzer.

4. A method as in claim 1 wherein the double delta approximation is performed using the equation below:

$$\rho^{dd}(x) \approx A_L \frac{1}{\sqrt{2\pi}\,\sigma_L} \exp\left(-\frac{(x-\mu_L)^2}{2\sigma_L^2}\right) + A_R \frac{1}{\sqrt{2\pi}\,\sigma_R} \exp\left(-\frac{(x-\mu_R)^2}{2\sigma_R^2}\right)$$

where AL represents amplitude of a left edge of two Gaussian distributions, $A_R$ represents amplitude of a right edge of the two Gaussian distributions, $\sigma_L$ represents a standard deviation for the left edge of the two Gaussian distributions, $\sigma_R$ represents the standard deviation for the right edge of the two Gaussian distributions, $\mu_L$ represents a mean for the left edge of the two Gaussian distributions, and $\mu_R$ represents a mean for the right edge of the two Gaussian distributions.

5. A method as in claim 1 wherein the ratio ($\xi^{dd}_{meas}$) is adjusted using a first order interpolation of values from the plurality of first ratios ($\xi^{ml}$).

6. A method for separating random and deterministic components of jitter comprising the following steps:
   obtaining a measured jitter distribution;
   using a measured value for deterministic jitter and a plurality of values for random jitter to calculate a plurality of first ratios of random jitter to deterministic jitter;

for each of the plurality of values for random jitter, convolving the value for random jitter with the measured value for deterministic jitter and performing a first type of approximation to calculate a plurality of second ratios of random jitter to deterministic jitter;

performing the first type of approximation on the measured jitter distribution to obtain a ratio of random jitter to deterministic jitter; and, adjusting the ratio using a relationship of the plurality of first ratios to the plurality of second ratios in order to produce a corrected ratio for allowing more accurate separation of components of random jitter and deterministic jitter.

7. A method as in claim 6 wherein the measured jitter distribution is obtained from a device under test using a jitter analyzer.

8. A method as in claim 6 wherein the measured value for deterministic jitter is obtained using a device characterization analyzer.

9. A method as in claim 6 wherein the first type of approximation is performed using the equation below:

$$\rho^{dd}(x) \approx A_L \frac{1}{\sqrt{2\pi}\,\sigma_L} \exp\left(-\frac{(x-\mu_L)^2}{2\sigma_L^2}\right) + A_R \frac{1}{\sqrt{2\pi}\,\sigma_R} \exp\left(-\frac{(x-\mu_R)^2}{2\sigma_R^2}\right)$$

where $A_L$ represents amplitude of a left edge of two Gaussian distributions, $A_R$ represents amplitude of a right edge of the two Gaussian distributions, $\sigma_L$ represents a standard deviation for the left edge of the two Gaussian distributions, $\sigma_R$ represents the standard deviation for the right edge of the two Gaussian distributions, $\mu_L$ represents a mean for the left edge of the two Gaussian distributions, and $\mu_R$ represents a mean for the right edge of the two Gaussian distributions.

10. A method as in claim 6 wherein the ratio is adjusted using a first order interpolation of values from the plurality of first ratios.

11. A method as in claim 6 wherein the first type of approximation is a double delta approximation.

* * * * *